US006928818B1

(12) United States Patent
Arnold et al.

(10) Patent No.: US 6,928,818 B1
(45) Date of Patent: Aug. 16, 2005

(54) ACTUATION ASSEMBLY FOR VARIABLE GEOMETRY TURBOCHARGERS

(75) Inventors: Steven Don Arnold, Rancho Palos Verdes, CA (US); Peter M. Haug, Redondo Beach, CA (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/763,473

(22) Filed: Jan. 23, 2004

(51) Int. Cl.$^7$ .......................... F02D 23/00; F01B 25/02
(52) U.S. Cl. .................... 60/602; 415/150; 415/148
(58) Field of Search .................. 60/602; 415/150, 415/148

(56) References Cited

U.S. PATENT DOCUMENTS

| | | | | |
|---|---|---|---|---|
| 2,392,200 A | * | 1/1946 | Thompson | 415/148 |
| 2,739,782 A | * | 3/1956 | White | 415/150 |
| 2,985,427 A | * | 5/1961 | Houghton | 415/148 |
| 3,243,159 A | * | 3/1966 | Hefler et al. | 415/150 |
| 4,274,329 A | | 6/1981 | Weyer | |
| 4,492,520 A | | 1/1985 | Marchand | 415/150 |
| 4,586,336 A | | 5/1986 | Horler | 60/602 |
| 4,590,816 A | | 5/1986 | Weyer | |
| 4,629,396 A | | 12/1986 | Lorett | 415/164 |
| 4,708,603 A | | 11/1987 | Kubo | |
| 4,737,071 A | * | 4/1988 | Horn, Jr. | 415/148 |
| 4,854,218 A | | 8/1989 | Stoll | |
| 5,620,301 A | | 4/1997 | Lawyer | 415/150 |
| 5,630,701 A | | 5/1997 | Lawyer | 415/150 |
| 6,129,511 A | * | 10/2000 | Salvage et al. | 415/150 |
| 6,269,642 B1 | * | 8/2001 | Arnold et al. | 60/602 |
| 6,527,508 B2 | * | 3/2003 | Groskreutz et al. | 415/150 |
| 6,679,057 B2 | * | 1/2004 | Arnold | 60/602 |
| 2002/0176774 A1 | | 11/2002 | Zinsmeyer et al. | 415/150 |

FOREIGN PATENT DOCUMENTS

GB     138592    *   5/1920

* cited by examiner

*Primary Examiner*—Thai-Ba Trieu
(74) *Attorney, Agent, or Firm*—Chris James; Ephraim Starr

(57) ABSTRACT

Improved actuation assemblies are used with variable geometry turbochargers comprising a plurality of movable aerodynamic vanes attached to a movable unison ring that is coupled to an actuator. The actuation assembly includes a crank arm that is attached at a first end to the actuator, and at a second end to the unison ring. A first gear member is attached to the crank arm second end and includes teeth. The unison ring includes a second gear member attached thereto that also comprises teeth. The teeth of the first and second gear members are cooperatively engaged with one another. The second gear member is movably attached to the unison ring to maintain predetermined distance between the first and second gear members during operation of the turbocharger and related thermal movement of the unison ring.

9 Claims, 2 Drawing Sheets

ACTUATION ASSEMBLY FOR VARIABLE GEOMETRY TURBOCHARGERS

FIELD OF INVENTION

This invention relates generally to the field of turbochargers and, more particularly, to variable geometry turbochargers having a plurality of movable aerodynamic vanes, and an actuation assembly for more efficiently and dependably moving the vanes within the turbocharger.

BACKGROUND OF THE INVENTION

Turbochargers for gasoline and diesel internal combustion engines are devices known in the art that are used for pressurizing or boosting the intake air stream, routed to a combustion chamber of the engine, by using the heat and volumetric flow of exhaust gas exiting the engine. Specifically, the exhaust gas exiting the engine is routed into a turbine housing of a turbocharger in a manner that causes an exhaust gas-driven turbine to spin within the housing.

The exhaust gas-driven turbine is mounted onto one end of a shaft that is common to a radial air compressor mounted onto an opposite end of the shaft and housed in a compressor housing. Thus, rotary action of the turbine causes the air compressor to spin within the compressor housing. The spinning action of the air compressor causes intake air to enter the compressor housing and be pressurized or boosted a desired amount before it is mixed with fuel and combusted within the engine combustion chamber.

In a turbocharger, it is often desirable to control the flow of exhaust gas to the turbine to improve the efficiency or operational range of the turbocharger. Variable geometry turbochargers (VGTs) have been configured to address this need. A type of such VGT is one having a variable or adjustable exhaust nozzle, referred to as a variable nozzle turbocharger.

Different configurations of variable nozzles have been employed in variable nozzle turbochargers to control the exhaust gas flow. One approach taken to achieve exhaust gas flow control in such VGTs involves the use of multiple vanes, which can be fixed, pivoting and/or sliding, positioned annularly around the turbine inlet.

The vanes are commonly controlled by a unison ring to alter the throat area of the passages between the vanes, thereby functioning to control the exhaust gas flow into the turbine. The unison ring is disposed within the turbine housing and is rotated by an actuator assembly to move the vanes in a manner to provide the desired control of gas flow. VGTs known in the art make use of a crank arm to translate an actuation movement provided by an actuator to the unison ring. The crank arm is connected to the unison ring by a pin and slot arrangement, wherein the crank arm includes an offset pin that is engaged within a slot in the unison ring. Configured in this manner, actuation of the crank arm causes the offset pin to be moved in a clockwise or counter-clockwise direction, thereby effecting rotational movement of the unison ring in a respective direction.

It is known that VGTs comprising such a crank arm-unison ring arrangement can be prone to suffer from two types of issues. A first issue involves sliding friction and the fact that the crank arm pin that engages the unison ring is know to incur a severe amount of sliding friction, which can cause the pin and/or unison ring slot to wear in an aggressive manner. Such wear can impact the desired interplay of the crank arm and unison ring by not providing the full range of desired movement, or ultimately can cause the crank arm pin to break, thereby prohibiting desired unison ring movement.

A second issue involves the high and cyclic temperatures that the VGT turbine housing and all parts disposed therein are subjected to. In this aggressive temperature environment, the VGT parts are exposed to constant thermal expansion and contraction cycles. Depending on the location, size, and materials used to form the parts that contact one another, i.e., the crank arm pin and unison ring slot, these interconnecting parts may undergo different degrees of thermal expansion and contraction. Such different thermal expansion and contraction characteristics can cause the crank arm pin to bind within the unison ring slot, thereby impairing efficient and dependable unison ring actuation.

It is, therefore, desired that an improved actuation assembly be constructed in a manner that minimizes or eliminates potential impairments to proper vane actuation caused either by unwanted sliding friction or thermal expansion/contraction binding between coupled actuating members. It is desired that such an improved actuation assembly be constructed in a manner capable of providing reliable vane actuation movement after repeated cycles of turbocharger operation. It is further desired that such an improved actuation assembly be configured in a manner permitting retrofit use in existing VGTs without significant modification.

SUMMARY OF THE INVENTION

Improved actuation assemblies, constructed in accordance with the principles of this invention, are specifically designed for use with variable geometry turbochargers comprising a plurality of movable aerodynamic vanes that are disposed within a turbocharger turbine housing. The turbocharger includes an actuator that is coupled, by virtue of the actuation assembly, to a movable unison ring also disposed within the turbine housing. The unison ring is attached to the plurality of aerodynamic vanes.

The actuation assembly comprises a crank arm that is rotatably disposed within the turbine housing. The crank arm is attached at a first end to the actuator, and is attached at a second end to the unison ring. A first gear member is attached to the crank arm second end, and includes a number of teeth. The unison ring includes a second gear member attached thereto that also comprises a number of teeth. The teeth of the first and second gear members are cooperatively engaged with one another.

The actuation assembly comprises means for maintaining a predetermined distance between the first and second gear members during operation of the turbocharger and related thermal movement of the unison ring. In an example embodiment, such means is provided in the form of cooperative coupling members between the unison ring and second gear member, whereby such cooperative coupling members are configured to both provide a dependable attachment therebetween, as well as allow for a predetermined amount of movement of the second gear member on the unison ring so as to maintain a desired distance or tolerance between the first and second gear members during turbocharger operation and thermal expansion of the unison ring relative to the crank arm.

Improved actuation assemblies of this invention operate to minimize or eliminate potential impairments to proper vane actuation caused either by unwanted sliding friction or thermal expansion/contraction binding between coupled actuating members.

BRIEF DESCRIPTION OF THE DRAWINGS

The invention will be more clearly understood with reference to the following drawings wherein.

DETAILED DESCRIPTION OF THE INVENTION

The invention, constructed in accordance with the principles of this invention, comprises an improved actuation assembly for causing rotational movement of a unison ring used in a turbocharger, including but not limited to a variable geometry turbocharger (VGT). For convenience, an exemplary embodiment using a VGT will be described throughout this specification. However, it will be readily understood by those skilled in the relevant technical field that the improved crank arm assembly of the present invention could be used in a variety of turbocharger configurations.

Figure 1:
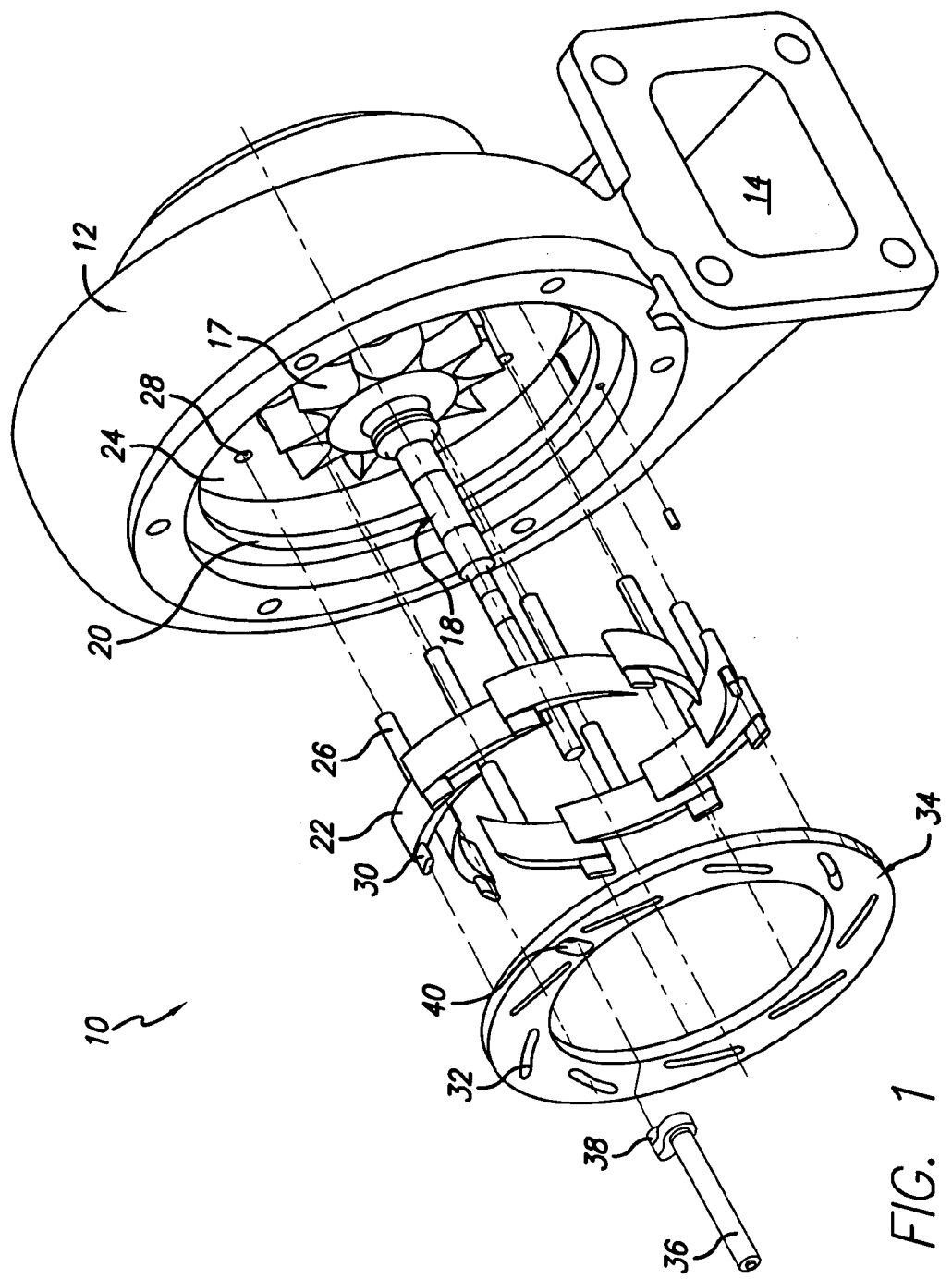
FIG. 1 is a perspective view of a turbine side of a prior art variable geometry turbocharger.

FIG. 1 illustrates a known VGT 10 that includes a turbine wheel housing 12. An exhaust gas-driven turbine 17 is rotatably disposed within the housing and is mounted onto one end of a shaft 18 that is common to a radial air compressor (not shown) mounted onto an opposite end of the shaft 18 and housed in a compressor housing. The turbine housing 12 is configured having an exhaust gas inlet 14 that is configured to direct exhaust gas radially to the turbine wheel, and an exhaust gas outlet (not shown) that is configured to direct exhaust gas axially away from the turbine wheel 17 and the turbine housing 12. A volute (not shown) is connected to the exhaust inlet 14, and an outer nozzle wall is incorporated in the turbine housing adjacent the volute. Exhaust gas, or other high energy gas supplying the turbocharger 10, enters the turbine housing through the inlet 14 and is distributed through the volute in the turbine housing 12 for substantially radial delivery to the turbine wheel 17 through a circumferential nozzle entry.

Multiple vanes 22, which can be fixed, pivoting and/or sliding, are positioned annularly around an inlet portion 20 of the turbine housing. The vanes 22 are commonly controlled to alter the throat area of the passages between the vanes, thereby functioning to control the exhaust gas flow into the turbine. An arm or post 26 is interposed between an axial surface of the vanes and a nozzle ring, and is used to connect the vanes within the turbine housing. In a preferred embodiment, the vanes are connected within the turbine housing by placement of the vane arms or posts 26 into respective openings 28 in the turbine housing.

A unison ring 34 is positioned adjacent the vanes, over an axial surface opposite from that connected to the arms or ports, and is movably disposed within the turbine housing 12, radially around the turbine wheel 17. Generally speaking, the nozzle and unison ring assembly operate to control the flow of exhaust gas entering the turbine housing 12 to the turbine wheel 17 by virtue of moving the vanes, thereby regulating turbocharger operation. The assembly includes the nozzle ring 24 that is attached to, for example, a nozzle wall of the turbine housing 12, and that is positioned concentrically around the turbine wheel 17. The unison ring 34 is configured to move the plurality of vanes in unison.

The vanes 22 are positioned concentrically around and upstream of the turbine wheel 17. The vanes are moved in unison by the unison ring to control the amount of exhaust gas flow directed to the turbine. The vanes each comprise a member or feature that is configured to cooperate with a complementary member or feature in the unison ring. In en example embodiment, the vane includes an actuation tab 30 that projects outwardly from an axial vane surface opposite from the nozzle ring. The actuation tabs 30 are sized, shaped, and positioned to be engaged within respective actuation slots 32 in the unison ring. Configured in this manner, in conjunction with the pivoting mounting of the vanes with the nozzle ring, rotational clockwise or counter-clockwise movement of the unison ring 34 within the turbine housing effects respective opening and closing movement of the vanes.

The unison ring 34 is rotated within the turbine housing 12 by cooperation with a crank arm 36. The crank arm 36 is coupled at one of its ends to an actuator (not shown) that is configured to rotate the crank arm in a clockwise or counter-clockwise direction to effect desired unison ring movement. The crank arm 36 includes an offset pin 38 projecting from its opposite end that is sized, shaped and positioned to engage an elliptical slot 40 in the unison ring 34. Configured in this manner, rotation of the crank arm causes the offset pin 38 to effect rotational movement of the unison ring, via its engagement within the slot 40. In an example embodiment, crank arm 36 rotation of approximately 120 degrees can cause the unison ring 34 to rotate approximately 20 degrees.

Figure 2:
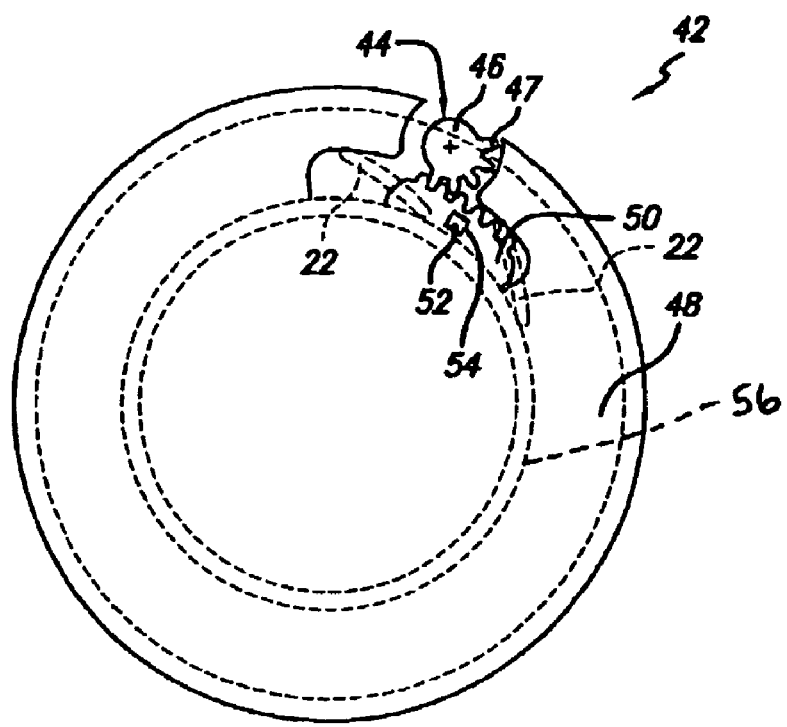
FIG. 2 is a side elevational view of the turbine housing with a portion cut-away to show an improved actuation assembly constructed according to the principles of this invention.
Figure 3:
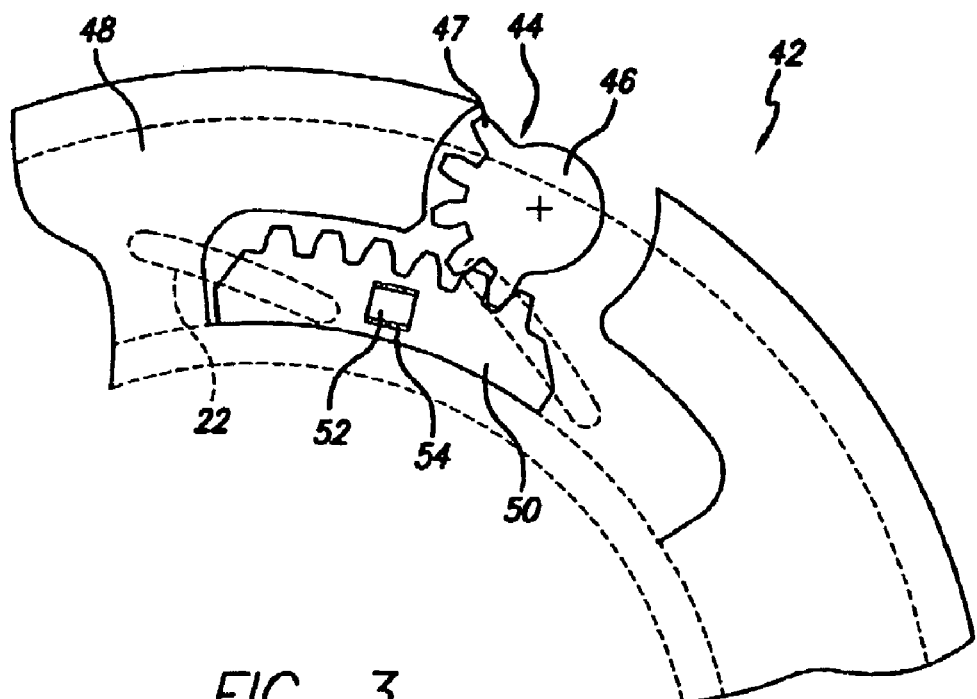
FIG. 3 is a detailed side elevational view of the improved actuation assembly of FIG. 2.

FIGS. 2 and 3 illustrate an example embodiment of an improved actuation assembly 42 constructed in accordance with this invention. The assembly comprises a crank arm 44 having a first gear member 46 at an axial end of the arm that is coupled to or that connects with a second gear member of the unison ring 48. In a preferred embodiment, the first gear member is a pinion gear 46 (crank arm pinion) that comprises a number of gear teeth 47 and can be attached to the crank arm by conventional method, e.g., by threaded attachment, welding or the like.

In a preferred embodiment, the second gear member is a rack gear (gear segment) 50 that is attached to the unison ring 48. The rack gear 50 may be connected to the unison ring 48 by conventional attachment method such as welding or the like. The actuation assembly includes means for maintaining a predetermined distance between the first and second gear members during operation of the turbocharger and related thermal movement of the unison ring. In a preferred embodiment, the rack gear 50 is coupled to the unison ring 48 by engagement between cooperative rack gear and unison ring surface features or coupling members. More specifically, the unison ring and rack gear can be joined together by cooperative coupling members that are designed to both provide a secure point of attachment, and to allow for a desired degree of thermal expansion/contraction movement between the rack gear and unison ring to thereby minimize or eliminate altogether unwanted thermally induced binding between the pinion gear 46 and rack gear 50.

In an example embodiment, the cooperative coupling members are configured to provide a tongue and groove attachment arrangement. Specifically, the unison ring 48 is configured having a tongue 52 that projects a distance outwardly therefrom, and that is sized and shaped to be accommodated by a groove or opening 54 disposed within a axially-facing surface of the rack gear 50. Alternatively, if desired, the rack gear could comprise the tongue coupling member, and the unison ring could comprise the groove or opening coupling member. The rack gear 50 is preferably attached to an axially-facing surface of the unison ring 48 that is opposite from the vanes, i.e., a surface that is directed away from the turbine wheel.

In a preferred embodiment, the groove or opening 54 is sized having an additional degree of clearance for the tongue 52 to permit a desire degree of unison ring thermal movement, e.g., to permit the unison ring to grow or shrink radially relative to the rack gear 50 in response to cyclic thermal expansion and contraction during turbocharger operation. Configured in this manner, the actuation assembly of this invention operates to minimize or eliminate altogether unwanted thermally induced binding between the pinion gear 46 and rack gear 50.

When rotated, the crank arm pinion 46 operates to drive the rack gear segment 50 in a circular arc around a centerline of the turbocharger 10. The rack gear 50 drives the unison ring 48 circumferentially with a purely tangential force and zero relative motion except when the unison ring 48 expands or contracts radially due to transient thermal changes. Thereby, operating to greatly reduce the amount of friction inherent in unison ring actuation.

The rack gear 50 is piloted on a diameter 56 similar to that of the unison ring 48. Thus, the theoretical center of the gear segment 50 is the center of the pilot diameter 56. During turbocharger operation, the thermal expansion growth of the rack gear 50 (when taken independent of the unison ring) is relatively small, as the dimension along the height of the rack gear from the pilot diameter 56 to the tooth profile is small. Thus, the thermal growth impact on the theoretical centerlines of the rack gear 50 and the pinion gear 46 is dramatically reduced.

The unison ring, however, being a large diameter hoop undergoes a relatively large amount of thermal growth, thereby operating to otherwise urge the rack gear towards the pinion gear. This is why the rack gear and unison ring coupling members have been specifically designed to accommodate a desired degree of unison ring thermal expansion/contraction movement while at the same time maintaining a desired distance between the rack gear and pinion gear centerlines, i.e., while maintaining a desired tolerance between the engaging gear teeth of the gear rack and pinion gear to avoid unwanted binding.

It is desired that the pinion gear and rack gear each be configured having a number of teeth that will provide a desired degree of unison ring movement relative to crank arm rotation. In an example embodiment, it is desired that the gear ratio between the engaging gear members be such as to provide a complete range of unison ring movement, and thus vane opening and closing movement, by rotating the crank arm in the range of from about 30 to 180 degrees. The amount of crank arm rotation needed to provide a complete range of unison ring movement is dependent on a number of design factors that can vary depending on the particular turbocharger design and application.

In an example embodiment, complete unison ring movement is achieved by rotating the crank arm a total of 120 degrees, i.e., from −60 degrees to +60 degrees. Ideally, it is desired that the amount of crank rotation to effect complete unison ring movement be as low as possible to minimize the sliding friction component between the two members. However, the low end of crank arm rotation can also be influenced by the degree of control that is desired over the unison ring movement. For example, if the gear ratio between the gear members are such that complete unison ring movement is achieved with only a slight crank arm rotation, the ability to precisely control the degree of unison ring movement may be reduced. Accordingly, the degree of control over unison ring movement is one of the design factors to be considered.

Having now described the invention in detail as required by the patent statutes, those skilled in the art will recognize modifications and substitutions to the specific embodiments disclosed herein. Such modifications are within the scope and intent of the present invention.

What is claimed is:

1. A method for actuating a plurality of movable aerodynamic vanes within a variable geometry turbocharger, the method comprising the step of rotating a crank arm that is disposed within a turbine housing of the turbocharger, the crank arm having a first gear member attached at one of its ends that is engaged with a second gear member that is attached to a moving unison ring by cooperative surface features, the unison ring being disposed within the turbocharger, wherein the step of rotating the crank arm causes the unison ring to be rotated by the engagement of the first and second gear members, and wherein the unison ring is coupled to the plurality of aerodynamic vanes to move the vanes in unison.

2. An actuation assembly for moving in unison a plurality of aerodynamic vanes disposed within a variable geometry turbocharger that includes an actuator coupled to a moving unison ring, the unison ring being disposed within a turbocharger turbine housing and attached to the plurality of aerodynamic vanes, the actuator comprising a crank arm rotatably disposed within the turbine housing and attached at a first end to the actuator and to a second end to the unison ring, wherein the crank arm second end includes a first gear member comprising teeth, and the unison ring includes a second gear member comprising teeth, wherein the teeth of the first and second gear members are cooperatively engaged with one another, and wherein the second gear member is coupled to the unison ring by cooperative surface features to permit unison ring thermal expansion and contraction movement during turbocharger operation while maintaining engagement between the first and second gear members.

3. The actuation assembly as recited in claim 2 wherein the first gear member is a pinion gear and the second gear member is a rack gear.

4. The actuation assembly as recited in claim 2 wherein the cooperative surface features comprise a tongue that cooperates within an opening, and wherein the tongue and opening are sized to permit thermal expansion and contraction movement between the unison ring and rack gear.

5. The actuation assembly as recited in claim 4 wherein the tongue projects outwardly from the unison ring, and the opening is disposed within a surface of the rack gear.

6. A turbocharger assembly comprising:
 a turbine housing;
 a turbine wheel carried within the turbine housing and attached to a shaft;
 a plurality of vanes pivotably disposed within the turbine housing;
 a moving unison ring attached to the plurality of vanes to move the vanes in unison with one another, the unison ring including a first gear member having teeth attached thereto;
 a crank arm disposed within the turbine for moving the unison ring, the crank arm including a second gear member at one of its ends and having teeth that are engaged with the teeth of the first gear member; and
 means for maintaining engagement between the first and second gear members during operation of the turbocharger, the means being cooperative surface features between the unison ring and the first gear member.

7. The turbocharger assembly as recited in claim 6 wherein the first gear member is a rack gear and the second gear member is a pinion gear.

8. The turbocharger assembly as recited in claim 6 wherein the cooperative attachment surface features comprise a tongue that projects from one of the unison ring and rack gear, into an opening of the other of the unison ring and rack gear.

9. A turbocharger assembly comprising:
   a turbine housing;
   a turbine wheel carried within the turbine housing and attached to a shaft;
   a plurality of vanes pivotably disposed within the turbine housing;
   a moving unison ring attached to the plurality of vanes to move the vanes in unison with one another, the unison ring including a rack gear having teeth attached thereto;
   a crank arm disposed within the turbine for affecting movement of the unison ring, the crank arm including a pinion gear at one of its ends that has teeth that are engaged with the teeth of the rack gear;
   wherein the rack gear is attached to the unison ring by cooperative surface features to permit unison ring thermal movement during turbocharger operation while maintaining a desired tolerance between the pinion gear and rack gear.

* * * * *